US011415217B2

(12) United States Patent
Fujii et al.

(10) Patent No.: US 11,415,217 B2
(45) Date of Patent: Aug. 16, 2022

(54) DEVICE FOR VEHICLE, SYSTEM AND METHOD

(71) Applicant: TOYOTA JIDOSHA KABUSHIKI KAISHA, Toyota (JP)

(72) Inventors: Kota Fujii, Nisshin (JP); Atsushi Tabata, Okazaki (JP); Koichi Okuda, Toyota (JP); Ken Imamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/369,500

(22) Filed: Jul. 7, 2021

(65) Prior Publication Data

US 2022/0018431 A1  Jan. 20, 2022

(30) Foreign Application Priority Data

Jul. 14, 2020  (JP) .............................. JP2020-120641

(51) Int. Cl.
| | |
|---|---|
| *F16H 59/72* | (2006.01) |
| *F16H 61/12* | (2010.01) |
| *F01P 11/16* | (2006.01) |
| *F16H 57/04* | (2010.01) |
| *F16H 61/00* | (2006.01) |

(52) U.S. Cl.
CPC .............. *F16H 59/72* (2013.01); *F01P 11/16* (2013.01); *F16H 57/0413* (2013.01); *F16H 2061/0084* (2013.01); *F16H 2061/0087* (2013.01)

(58) Field of Classification Search
CPC .. F16H 59/72; F16H 61/12; F16H 2061/0096; F16H 59/14; F01P 11/16
See application file for complete search history.

(56) References Cited

U.S. PATENT DOCUMENTS

| | | | | |
|---|---|---|---|---|
| 6,073,072 A | * | 6/2000 | Ishii ...................... | F16H 61/12 477/154 |
| 2007/0265135 A1 | * | 11/2007 | Ido ......................... | F16H 59/72 477/34 |
| 2010/0185375 A1 | * | 7/2010 | Hanzawa .............. | B60W 10/10 701/70 |
| 2010/0195693 A1 | * | 8/2010 | Kitajima ................ | F16H 61/12 702/182 |

(Continued)

FOREIGN PATENT DOCUMENTS

JP  2013-160273 A  8/2013

*Primary Examiner* — Long T Tran
(74) *Attorney, Agent, or Firm* — Oliff PLC (57) ABSTRACT

A device for a vehicle including: a memory configured to store mapping data including machine learning data defining a mapping that uses an estimation variable that is a variable indicating a vehicle operation status of the vehicle and a detection value of a sensor detecting an oil temperature of a power transmission device as input variables, and uses an element corresponding to the input variables as an output variable; and a processor configured to: acquire the input variables; use the mapping to acquire the element as the output variable of the mapping corresponding to the input variables; and determine based on the element whether the detection value becomes equal to or higher than a threshold value due to occurrence of an abnormality in the power transmission device or a mode of vehicle operation by the driver of the vehicle.

9 Claims, 4 Drawing Sheets

(56) References Cited

U.S. PATENT DOCUMENTS

| | | | | |
|---|---|---|---|---|
| 2012/0318214 | A1* | 12/2012 | Iwai | F01P 11/16 |
| | | | | 123/41.15 |
| 2013/0116900 | A1* | 5/2013 | Yuyama | F16H 61/12 |
| | | | | 701/58 |
| 2016/0214610 | A1* | 7/2016 | Kotsuji | B60W 30/18 |
| 2016/0311510 | A1* | 10/2016 | Bamba | G06F 3/04847 |
| 2021/0341457 | A1* | 11/2021 | Okuda | B60W 40/12 |

* cited by examiner

DEVICE FOR VEHICLE, SYSTEM AND METHOD

CROSS-REFERENCE TO RELATED APPLICATION

This application claims priority to Japanese Patent Application No. 2020-120641 filed on Jul. 14, 2020, incorporated herein by reference in its entirety.

BACKGROUND

1. Technical Field

The present disclosure relates to a device for a vehicle, a system and a method.

2. Description of Related Art

Japanese Unexamined Patent Application Publication No. 2013-160273 (JP 2013-160273 A) describes an example of an oil temperature detection device for a transmission. When the transmission is operating while some abnormality has occurred in the transmission, heat may be generated at the location where the abnormality occurs, and the oil temperature, which is the temperature of the oil circulating in the transmission, may rise. Therefore, the oil temperature detection device determines whether an abnormality has occurred in the transmission based on the oil temperature detection value which is the detection value of the oil temperature sensor. When it is determined that an abnormality has occurred, the driver of the vehicle is notified that an abnormality has occurred.

SUMMARY

The amount of operation of the transmission varies depending on the mode of vehicle operation by the vehicle driver, such as accelerator operation and brake operation. When the amount of operation of the transmission changes, the temperature of the oil circulating in the transmission also changes. Therefore, in the above oil temperature detection device, even when the oil temperature detection value rises due to the mode of the vehicle operation of the driver, it may be determined that an abnormality has occurred in the transmission. That is, when the oil temperature detection value rises even when an abnormality has not actually occurred in the transmission, it may be determined that an abnormality has occurred in the transmission.

A first aspect of the disclosure relates to a device for a vehicle, the vehicle having a power transmission device and a sensor that detects an oil temperature that is a temperature of oil circulating in the power transmission device, the device including: a memory configured to store mapping data including data learned by machine learning, the data defining a mapping that uses an estimation variable that is a variable indicating a vehicle operation status of the vehicle and a detection value of the sensor as input variables, and uses an element corresponding to the input variables as an output variable; and a processor configured to: acquire the input variables; use the mapping to acquire the element as the output variable of the mapping corresponding to the input variables; and determine based on the element whether the detection value becomes equal to or higher than a threshold value due to occurrence of an abnormality in the power transmission device or a mode of vehicle operation by a driver of the vehicle.

When the power transmission device is operating, heat corresponding to the operation is generated in the power transmission device. The heat generated in the power transmission device is transferred to the oil circulating in the power transmission device. As a result, the temperature rise of the power transmission device is suppressed.

When the vehicle operation of the vehicle driver changes, the amount of operation of the power transmission device changes. When the amount of operation of the power transmission device changes, the heat generation amount of the power transmission device due to the operation changes. Therefore, the oil temperature, which is the temperature of the oil circulating in the power transmission device, changes. That is, under the condition that no abnormality has occurred in the power transmission device, the oil temperature can be estimated based on the estimation variable, which is a variable indicating the state of the vehicle operation of the driver. When the estimated value of the oil temperature is relatively high and the oil temperature detection value is high, it can be inferred that the driver is performing a vehicle operation that causes the oil temperature to rise. On the other hand, when the oil temperature detection value becomes high even though the estimated value of the oil temperature is relatively low, the oil temperature is rising even though the driver has not performed the vehicle operation that causes the oil temperature to rise. In such a case, it can be inferred that the oil temperature detection value has risen due to occurrence of an abnormality in the power transmission device.

In the above configuration, based on the element output from the mapping by inputting the above estimation variable and the oil temperature detection value as the input variables to the mapping, it is determined whether the oil temperature detection value becomes equal to or higher than the oil temperature determination value due to occurrence of an abnormality in the power transmission device or the mode of the vehicle operation of the driver of the vehicle. As a result, it is possible to suppress the determination that an abnormality has occurred in the power transmission device from being made even though an abnormality has not occurred in the power transmission device.

In the above aspect, the mapping may use a variable specifying whether the detection value becomes equal to or higher than the threshold value due to occurrence of an abnormality in the power transmission device or a mode of vehicle operation by the driver of the vehicle as the output variable as the element corresponding to the input variables.

As a result of learning by machine learning, the above mapping outputs a variable that specifies the factor that causes the oil temperature to become equal to or higher than the oil temperature determination value. Therefore, according to the above configuration, the factor that causes the oil temperature to become equal to or higher than the oil temperature determination value can be determined by inputting the input variables acquired in the acquisition process into the mapping.

In the above aspect, the mapping may use an estimated value of the oil temperature as the output variable as the element corresponding to the input variables; and the processor may be configured to: acquire the estimated value of the oil temperature using the mapping and the input variables; and determine based on the estimated value of the oil temperature whether the detection value becomes equal to or higher than the threshold value due to occurrence of an abnormality in the power transmission device or a mode of vehicle operation by the driver of the vehicle, when the detection value becomes equal to or higher than the threshold value.

According to the above configuration, the estimated value of the oil temperature is derived by inputting the input variables acquired in the acquisition process into the mapping. For example, when the oil temperature is not rising due to the vehicle operation of the driver, it can be inferred that the difference between the oil temperature detection value and the estimated value of the oil temperature becomes large, or the estimated value of the oil temperature is not rising even though the oil temperature detection value is rising. On the other hand, when the oil temperature is rising due to the vehicle operation of the driver, it can be inferred that the estimated value of the oil temperature rises in the same manner as the oil temperature detection value.

Therefore, in the above configuration, when the oil temperature detection value becomes equal to or higher than the oil temperature determination value, based on the estimated value of the oil temperature output from the mapping, it can be determined whether the oil temperature detection value becomes equal to or higher than the oil temperature determination value due to occurrence of an abnormality in the power transmission device or the mode of the vehicle operation of the driver.

In the above aspect, the estimation variable may include at least one of a vehicle speed or an accelerator operation amount. The higher the vehicle speed is, the larger the amount of operation of the power transmission device becomes. Therefore, the oil temperature tends to rise. Further, the larger the accelerator operation amount is, the larger the input from the power source to the power transmission device becomes. Since the amount of operation of the power transmission device increases, the oil temperature tends to rise. Therefore, according to the above configuration, by using at least one of the vehicle speed and the accelerator operation amount as the estimation variable, it is possible to improve the accuracy of determining the factor that causes the oil temperature detection value to become equal to or higher than the oil temperature determination value.

In the above aspect, the vehicle may be provided with an internal combustion engine, and the oil may be cooled by heat exchange with a coolant of the internal combustion engine; and the input variables may further include a temperature of the coolant of the internal combustion engine.

When the oil circulating in the power transmission device is cooled by heat exchange with the coolant of the internal combustion engine, the oil temperature is easily affected by the temperature of the coolant of the internal combustion engine. Therefore, according to the above configuration, by using the temperature of the coolant of the internal combustion engine as an input variable in addition to the above estimation variable and the oil temperature detection value, it is possible to improve the accuracy of determining the factor that causes the oil temperature detection value to become equal to or higher than the oil temperature determination value.

In the above aspect, the input variables may further include an outside air temperature. The higher the outside air temperature is, the higher the oil temperature tends to be. Therefore, according to the above configuration, by using the outside air temperature as an input variable in addition to the above estimation variable and the oil temperature detection value, it is possible to improve the accuracy of determining the factor that causes the oil temperature detection value to become equal to or higher than the oil temperature determination value.

A second aspect of the disclosure relates to a system including: a device according to the first aspect; and a notification device that, when the detection value becomes equal to or higher than the threshold value, notifies the driver of the vehicle of a notification based on a result of determining a factor that causes the detection value to become equal to or higher than the threshold value.

According to the above configuration, it is possible to suppress the driver of the vehicle from being notified that an abnormality has occurred in the power transmission device even though an abnormality has not occurred in the power transmission device.

A third aspect of the disclosure relates to a method comprising: acquiring a detection value of a sensor and an estimation variable as input variables, the sensor detecting an oil temperature that is a temperature of oil circulating in a power transmission device for a vehicle, the estimation variable being a variable indicating a vehicle operation status of the vehicle; using a mapping to acquire an element as an output variable of the mapping, the output variable corresponding to the input variables, the mapping being defined by data included by mapping data, the mapping data being stored in a memory, the data being learned by machine learning; and determining based on the element whether the detection value becomes equal to or higher than a threshold value due to occurrence of an abnormality in the power transmission device or a mode of vehicle operation by a driver of the vehicle.

In the above configuration, based on the element output from the mapping by inputting the above estimation variable and the oil temperature detection value as the input variables to the mapping, it is determined whether the oil temperature detection value becomes equal to or higher than the oil temperature determination value due to occurrence of an abnormality in the power transmission device or the mode of the vehicle operation of the driver of the vehicle. As a result, it is possible to suppress the determination that an abnormality has occurred in the power transmission device from being made even though an abnormality has not occurred in the power transmission device.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Hereinafter, a first embodiment of an abnormality determination device for a power transmission device and a warning system will be described with reference to FIGS. 1 to 5.

Figure 1:
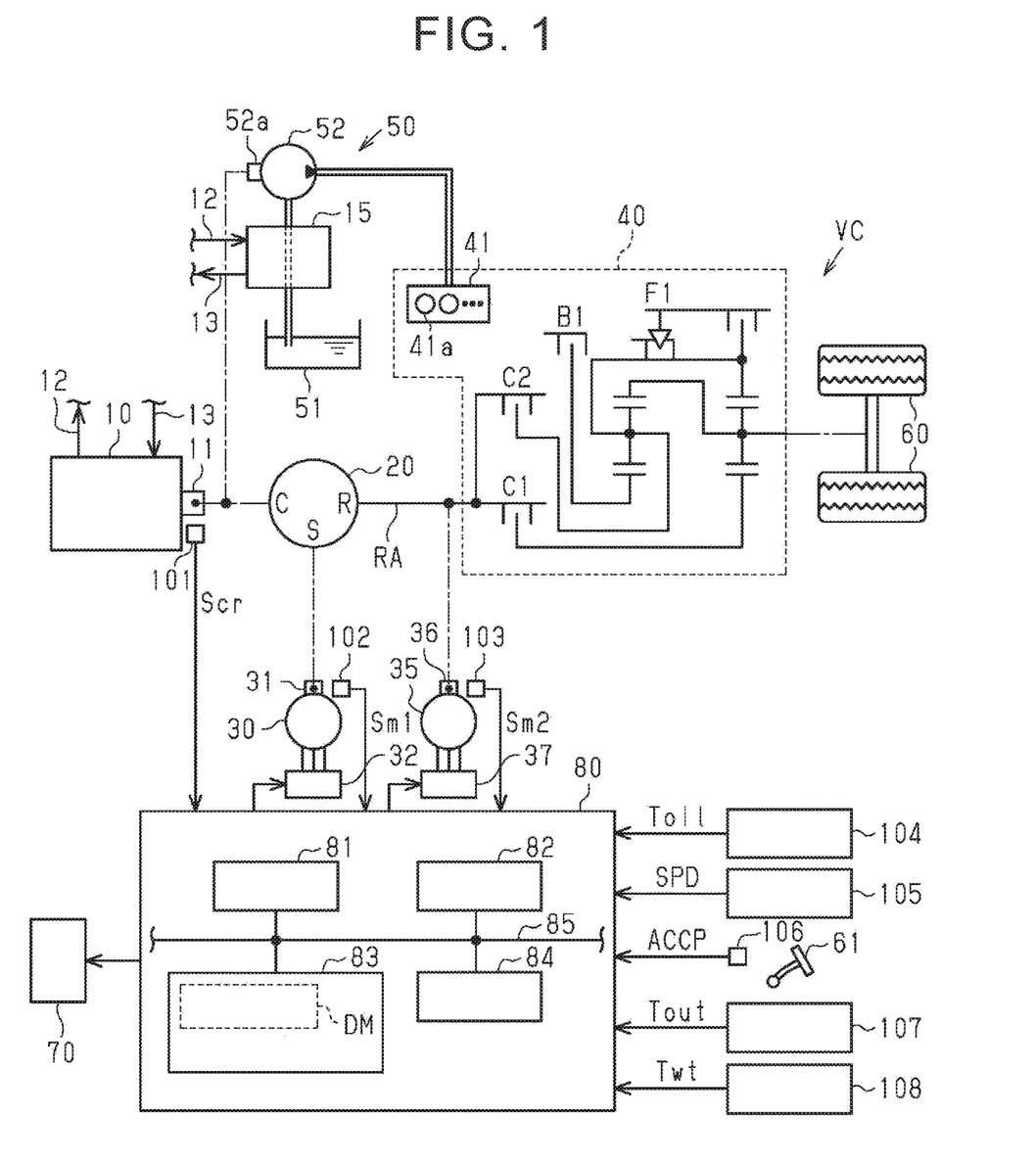
FIG. 1 is a diagram showing a control device and a vehicle drive system controlled by the control device in a first embodiment.

First, a schematic configuration of a vehicle equipped with the abnormality determination device will be described. As shown in FIG. 1, a vehicle VC includes an internal combustion engine 10, a power split device 20, a first motor generator 30, a second motor generator 35, a transmission 40, and drive wheels 60.

The power split device 20 is connected to a crankshaft 11 of the internal combustion engine 10. The power split device 20 is a planetary gear mechanism having a sun gear S, a ring gear R, and a carrier C. The crankshaft 11 is connected to the carrier C of the power split device 20. A rotating shaft 31 of the first motor generator 30 is connected to the sun gear S. A rotating shaft 36 of the second motor generator 35 is connected to a ring gear shaft RA, which is the output shaft of the ring gear R. Further, the input shaft of the transmission 40 is connected to the ring gear shaft RA. A plurality of drive wheels 60 is connected to the output shaft of the transmission 40 via a differential (not shown).

When the output torque of the internal combustion engine 10 is input to the carrier C of the power split device 20 via the crankshaft 11, the output torque of the internal combustion engine 10 is divided into the sun gear S side and the ring gear R side. When the first motor generator 30 operates as an electric motor and the output torque of the first motor generator 30 is input to the sun gear S of the power split device 20 via the rotating shaft 31, the output torque of the first motor generator 30 is divided into the carrier C side and the ring gear R side.

When the second motor generator 35 operates as an electric motor and the output torque of the second motor generator 35 is input to the ring gear shaft RA via the rotating shaft 36, the output torque of the second motor generator 35 is transmitted to the transmission 40. Further, when the torque from the drive wheel 60 side is input to the second motor generator 35 via the ring gear shaft RA, the second motor generator 35 operates as a generator, and a regenerative braking force is generated in the vehicle VC.

The transmission 40 includes a first clutch C1, a second clutch C2, a brake mechanism B1, and a one-way clutch F1. The shift stage of the transmission 40 is switched by the combination of the engaged state and the disengaged state of the first clutch C1, the second clutch C2, and the brake mechanism B1, and the combination of the restricted state and the allowable state of the one-way clutch F1.

The vehicle VC includes an oil supply unit 50 that supplies oil to the transmission 40. The oil supply unit 50 includes an oil pan 51 for storing oil and a mechanically driven oil pump 52. A driven shaft 52a of the oil pump 52 is connected to the carrier C of the power split device 20. The oil pump 52 sucks the oil in the oil pan 51 and discharges the oil to the transmission 40. The pressure of the oil discharged from the oil pump 52 is adjusted by a hydraulic control circuit 41 of the transmission 40. The hydraulic control circuit 41 includes a plurality of solenoid valves 41a. The hydraulic control circuit 41 controls the oil flow state and the oil pressure by energizing each solenoid valve 41a.

The vehicle VC includes a cooling device 15 for cooling the coolant of the internal combustion engine 10. The relatively high-temperature coolant circulating in the internal combustion engine 10 flows into the cooling device 15 via a first cooling pipe 12. The relatively low-temperature coolant cooled by the cooling device 15 is returned to the internal combustion engine 10 via a second cooling pipe 13. The cooling device 15 is configured to cool the oil circulating in the transmission 40 as well. That is, the oil pumped from the oil pan 51 by the operation of the oil pump 52 is cooled by heat exchange with the coolant of the internal combustion engine 10 and then discharged from the oil pump 52 to the hydraulic control circuit 41.

A notification device 70 is provided in the vehicle cabin of the vehicle VC. When there is a possibility that an abnormality has occurred in the transmission 40, the notification device 70 notifies the driver of the vehicle VC that an abnormality has occurred in the transmission 40. The content that is notified by the notification device 70 to the driver will be described later.

A control device 80 controls the internal combustion engine 10 and operates various operation units of the internal combustion engine 10 in order to control torque, an exhaust component ratio, and the like, which are control amounts thereof. Further, the control device 80 controls the first motor generator 30 and operates a first inverter 32 in order to control torque, rotation speed, and the like, which are control amounts thereof. Further, the control device 80 controls the second motor generator 35 and operates a second inverter 37 in order to control torque, rotation speed, and the like, which are control amounts thereof. Further, the control device 80 controls the transmission 40 and operates each solenoid valve 41a of the hydraulic control circuit 41.

When the control device 80 controls the above control amounts, the control device 80 references the output signal Scr of a crank angle sensor 101, the output signal Sm1 of a first rotation angle sensor 102 that detects the rotation angle of the rotating shaft 31 of the first motor generator 30, and the output signal Sm2 of a second rotation angle sensor 103 that detects the rotation angle of the rotating shaft 36 of the second motor generator 35. Further, the control device 80 references the oil temperature detection value Toil that is the temperature of the oil detected by an oil temperature sensor 104, the vehicle speed SPD that is the moving speed of the vehicle VC detected by a vehicle speed sensor 105, and the accelerator operation amount ACCP that is a depression amount of an accelerator pedal 61 detected by an accelerator sensor 106. Further, the control device 80 references the outside air temperature detection value Tout, which is the outside air temperature (e.g.: ambient temperature) detected by an outside air temperature sensor 107, and the coolant temperature detection value Twt detected by a coolant temperature sensor 108. The coolant temperature detection value Twt is a detection value of the temperature of the coolant circulating in the internal combustion engine 10.

The control device 80 includes a central processing unit (CPU) 81, a read only memory (ROM) 82, a storage device 83 that is an electrically rewritable non-volatile memory, and a peripheral circuit 84, which can communicate with each other via a local network 85. Here, the peripheral circuit 84 includes a circuit that generates a clock signal that defines the internal operation, a power supply circuit, a reset circuit, and the like. The control device 80 controls the control amounts when the CPU 81 executes the program stored in the ROM 82.

The mapping data DM is stored in the storage device 83. The mapping data DM is data that defines a mapping that outputs an element corresponding to input variables when various input variables described later are input, and includes data learned by machine learning.

The oil temperature detection value Toil may become high when the vehicle VC runs. The following two points can be considered as factors that cause the oil temperature detection value Toil to increase.

When an abnormality has occurred in the transmission 40
When the amount of operation of the transmission 40 is large depending on the mode of the driver's vehicle operation When some abnormality has occurred in the transmission 40, heat is generated at the location where the abnormality has occurred. Then, the heat generated at the above location is transferred to the oil circulating in the transmission 40. Therefore, the oil temperature rises.

When the transmission 40 is operating, heat generated by the operation is generated in the transmission 40. For example, heat is generated in each solenoid valve 41a of the hydraulic control circuit 41. Further, heat may be generated when the friction engaging elements such as the clutches C1, C2 and the brake mechanism B1 are engaged. As described above, the heat generated by the transmission 40 increases as the amount of operation of the transmission 40 increases. The heat generated by the transmission 40 is transferred to the oil circulating in the transmission 40. Therefore, the oil temperature rises.

In the present embodiment, when the oil becomes overheated, the control device 80 determines whether the oil is overheated due to occurrence of an abnormality in the transmission 40 or the mode of the driver's vehicle operation. Then, the control device 80 causes the notification device 70 to notify the driver according to the result of the determination. The "driver's vehicle operation" referred to here is an operation of the driver that accelerates or decelerates the vehicle VC, such as an accelerator operation or a brake operation.

Figure 2:
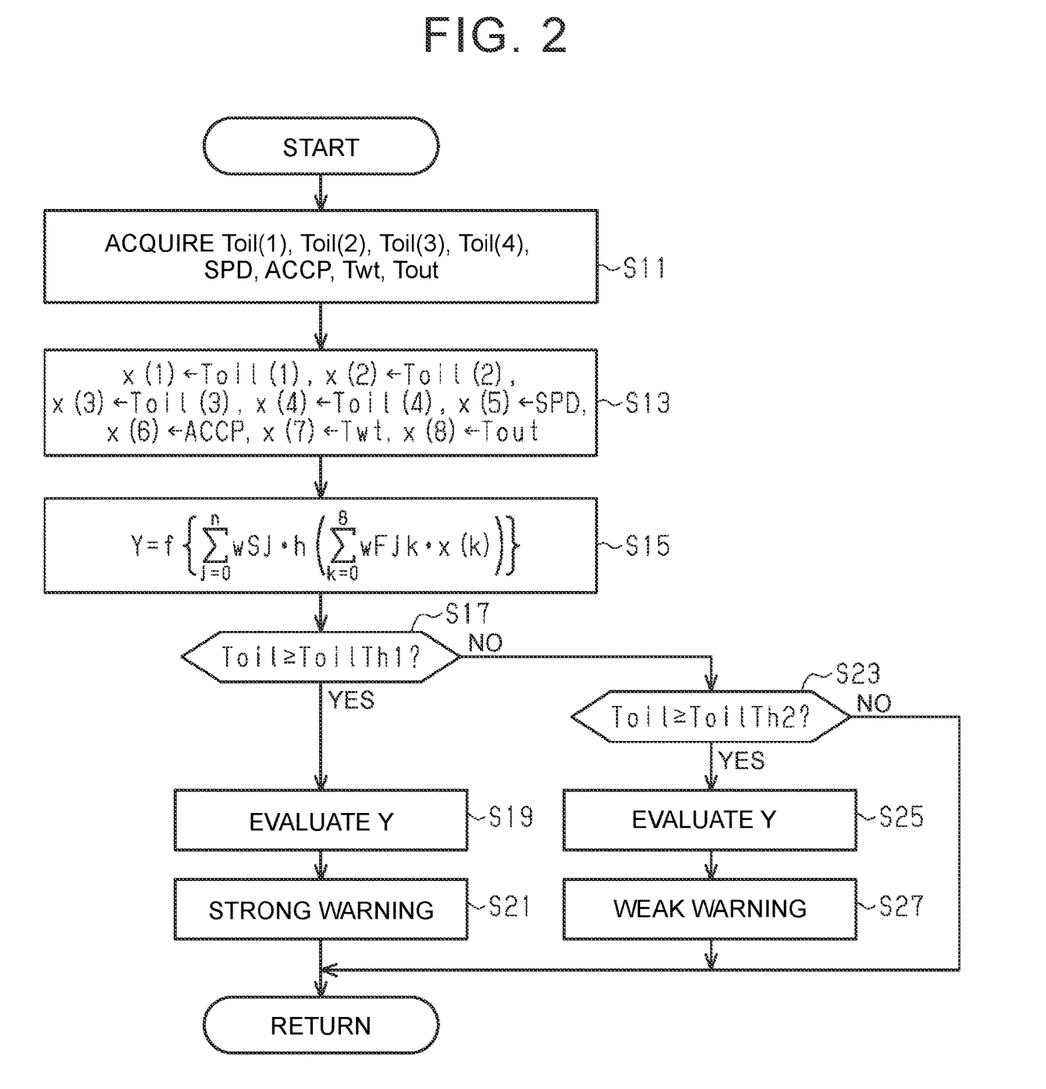
FIG. 2 is a flowchart showing a series of processes executed by the control device.

With reference to FIG. 2, a series of processing procedures executed by the control device 80 in order to determine the cause when the oil circulating in the transmission 40 becomes overheated will be described. The series of processes shown in FIG. 2 is realized when the CPU 81 repeatedly executes the program stored in the ROM 82 at a predetermined cycle.

First, in step S11, the CPU 81 acquires the time series data of the oil temperature detection value Toil, the vehicle speed SPD, the accelerator operation amount ACCP, the coolant temperature detection value Twt, and the outside air temperature detection value Tout. The time series data of the oil temperature detection value Toil is composed of a plurality of (for example, four) sampling values "Toil(1), Toil(2), Toil(3), Toil(4)" of the oil temperature detection value Toil. Each sampling value constituting the time series data is sampled at different timings. In the present embodiment, the time series data is composed of a plurality of sampling values adjacent to each other in time series when sampling is performed at a constant sampling cycle.

Subsequently, in step S13, the CPU 81 substitutes each detection value acquired in step S11 into the input variables $x(1)$ to $x(8)$ for mapping for determining the factor that causes the oil temperature detection value Toil to increase. That is, the CPU 81 substitutes the oil temperature detection value Toil(1) into the input variable $x(1)$, the oil temperature detection value Toil(2) into the input variable $x(2)$, the oil temperature detection value Toil(3) into the input variable $x(3)$, and the oil temperature detection value Toil(4) into the input variable $x(4)$. Further, the CPU 81 substitutes the vehicle speed SPD into the input variable $x(5)$ and the accelerator operation amount ACCP into the input variable $x(6)$. Further, the CPU 81 substitutes the coolant temperature detection value Twt into the input variable $x(7)$ and the outside air temperature detection value Tout into the input variable $x(8)$.

Then, in the next step S15, the CPU 81 calculates the output variable Y by inputting the input variables $x(1)$ to $x(8)$ into the mapping defined by the mapping data DM stored in the storage device 83.

In the present embodiment, the mapping is configured as a fully connected feedforward neural network with one intermediate layer. The above neural network includes an activation function $h(x)$ as an input side-nonlinear mapping that non-linearly transforms each of the input side coefficient wFjk (j=0 to n, k=0 to 5) and the output of the input side linear mapping that is a linear mapping defined by the input side coefficient wFjk. In the present embodiment, the hyperbolic tangent "tanh(x)" is exemplified as the activation function $h(x)$. Further, the above neural network includes an activation function $f(x)$ as an output side-nonlinear mapping that non-linearly transforms each of the output side coefficient wSj (j=0 to n) and the output of the output side linear mapping that is a linear mapping defined by the output side coefficient wSj. In the present embodiment, the hyperbolic tangent "tanh(x)" is exemplified as the activation function $f(x)$. The value n indicates the dimension of the intermediate layer. In the present embodiment, the value n is smaller than the dimension "8" of the input variable x. The input side coefficient wFj0 is a bias parameter and is a coefficient of the input variable $x(0)$. The input variable $x(0)$ is defined as "1". Further, the output side coefficient wS0 is a bias parameter.

The mapping data DM is a learned model learned using a vehicle having the same specifications as the vehicle VC before being mounted on the vehicle VC. Here, in learning of the mapping data DM, training data including teacher data and input data is acquired in advance. That is, when the vehicle is actually running, the time series data of the oil temperature detection value Toil, the vehicle speed SPD, the accelerator operation amount ACCP, the coolant temperature detection value Twt, and the outside air temperature detection value Tout are acquired as the input data. In addition, abnormality determination information, which is information on whether an abnormality has occurred in the transmission 40, is acquired as the teacher data. For example, the abnormality determination information when an abnormality has occurred may be set to "0", and the abnormality determination information when an abnormality has not occurred may be set to "1".

Then, by running the vehicle under various situations, a plurality of training data including the teacher data and the input data is generated. For example, by mounting a transmission 40 in which no abnormality has occurred in a vehicle and running the vehicle, abnormality determination information when no abnormality has occurred in the transmission 40 can be acquired as the teacher data, and various detection values when no abnormality has occurred in the transmission 40 can be acquired as the input data. Further, by mounting a transmission 40 in which an abnormality is intentionally generated in a vehicle and running the vehicle, abnormality determination information when an abnormality has occurred in the transmission 40 can be acquired as the teacher data, and various detection values when an abnormality has occurred in the transmission 40 can be acquired as the input data.

The mapping data DM is learned using such a plurality of training data. That is, the input side variable and the output side variable are adjusted such that the error between the variable output by the mapping data DM with the input data as the input and the actual abnormality determination information is equal to or less than an allowable value.

In step S17, the CPU 81 determines whether the oil temperature detection value Toil is equal to or higher than the first oil temperature determination value ToilTh1. The first oil temperature determination value ToilTh1 is set as a criterion for determining whether the oil temperature has risen to the vicinity of the upper limit of the oil temperature allowed as the oil circulating in the transmission 40. That is, an oil temperature slightly lower than the upper limit ToilLim of the oil temperature is set as the first oil temperature determination value ToilTh1. Therefore, when the oil temperature detection value Toil is equal to or higher than the first oil temperature determination value ToilTh1, it is preferable to quickly reduce the amount of operation of the transmission 40.

When the oil temperature detection value Toil is equal to or higher than the first oil temperature determination value ToilTh1 (S17: YES), the CPU 81 shifts the process to the next step S19. In step S19, the CPU 81 evaluates the output variable Y calculated in step S15. That is, the CPU 81 determines whether the output variable Y is a value indicating that the oil temperature has risen due to occurrence of an abnormality in the transmission 40, or a value indicating that the oil temperature has risen due to the mode of the driver's vehicle operation. Subsequently, in step S21, the CPU 81 issues a strong warning, which is a warning according to the result of the evaluation in step S19. That is, when the output variable Y is a value indicating that the oil temperature has risen due to occurrence of an abnormality in the transmission 40, the CPU 81 notifies the driver via the notification device 70 that the oil is overheated due to occurrence of an abnormality in the transmission 40. At this time, the CPU 81 may cause the notification device 70 to notify the driver to urge the driver to take the vehicle VC to a repair shop such as a dealer. On the other hand, when the output variable Y is a value indicating that the oil temperature has risen due to the mode of the driver's vehicle operation, the CPU 81 notifies the driver via the notification device 70 that the oil is overheated due to the driver's vehicle operation. After that, the CPU 81 temporarily ends the series of processes.

On the other hand, in step S17, when the oil temperature detection value Toil is lower than the first oil temperature determination value ToilTh1 (S17: NO), the CPU 81 shifts the process to the next step S23. In step S23, the CPU 81 determines whether the oil temperature detection value Toil is equal to or higher than the second oil temperature determination value ToilTh2. A value smaller than the first oil temperature determination value ToilTh1 is set as the second oil temperature determination value ToilTh2. The second oil temperature determination value ToilTh2 is a determination value for determining whether the oil may become overheated if the vehicle VC is run as it is, although the oil is not yet in the overheated state.

When the oil temperature detection value Toil is lower than the second oil temperature determination value ToilTh2 (S23: NO), the CPU 81 temporarily ends the series of processes. On the other hand, when the oil temperature detection value Toil is equal to or higher than the second oil temperature determination value ToilTh2 (S23: YES), the CPU 81 shifts the process to the next step S25. In step S25, the CPU 81 evaluates the output variable Y calculated in step S15. That is, the CPU 81 determines whether the output variable Y is a value indicating that the oil temperature has risen due to occurrence of an abnormality in the transmission 40, or a value indicating that the oil temperature has risen due to the mode of the driver's vehicle operation. Subsequently, in step S27, the CPU 81 issues a weak warning, which is a warning according to the result of the evaluation in step S25. That is, when the output variable Y is a value indicating that the oil temperature has risen due to occurrence of an abnormality in the transmission 40, the CPU 81 causes the notification device 70 to notify the driver that the oil temperature is increasing due to occurrence of an abnormality in the transmission 40. Further, when the output variable Y is a value indicating that the oil temperature has risen due to the mode of the driver's vehicle operation, the CPU 81 causes the notification device 70 to notify the driver that the oil temperature is increasing due to the driver's vehicle operation. After that, the CPU 81 temporarily ends the series of processes.

Figure 3:
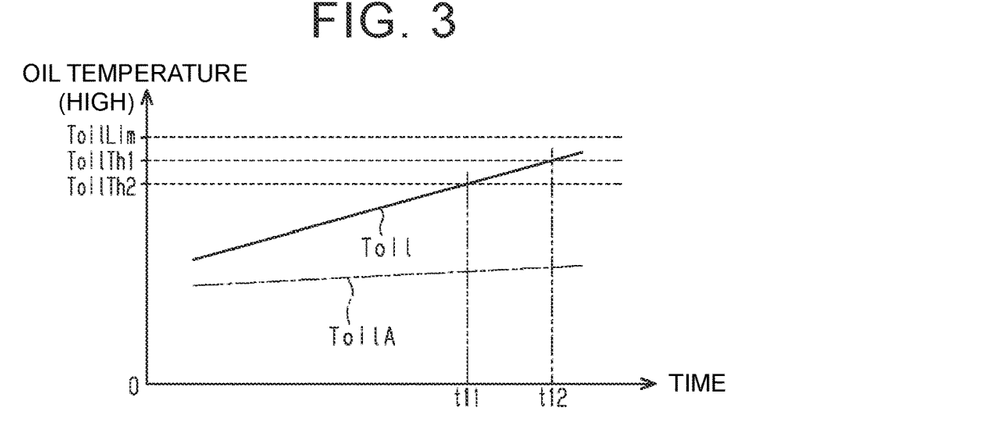
FIG. 3 is a time chart showing a transition of an oil temperature detection value and an estimated value of an oil temperature.

The operations of the present embodiment will be described. FIG. 3 shows the relationship between the oil temperature detection value Toil and the estimated value of the oil temperature ToilA based on the mode of the driver's vehicle operation when an abnormality has occurred in the transmission 40. When the vehicle VC continues to run in a state where an abnormality has occurred in the transmission 40, the oil temperature detection value Toil gradually increases as shown by the solid line in FIG. 3. However, since the driver has not made vehicle operation that causes the oil temperature to rise, the estimated value of the oil temperature ToilA does not increase much as shown by the long dashed short dashed line in FIG. 3. When the oil temperature detection value Toil reaches the second oil temperature determination value ToilTh2 at time t11, a weak warning is started. In this case, the output variable Y output from the mapping is a value indicating that the oil temperature has risen due to occurrence of an abnormality in the transmission 40. Therefore, the notification device 70 notifies the driver that the oil temperature is increasing due to occurrence of an abnormality in the transmission 40.

When the vehicle VC continues to run after that, the oil temperature detection value Toil reaches the first oil temperature determination value ToilTh1 at time t12. Then, the warning issued by the notification device 70 shifts from a weak warning to a strong warning. Even under such circumstances, when the driver has not made vehicle operation that causes the oil temperature to rise, the estimated value of the oil temperature ToilA does not increase much. In this case, the output variable Y output from the mapping is a value indicating that the oil temperature has risen due to occurrence of an abnormality in the transmission 40. As a result, the notification device 70 notifies the driver that the oil has become overheated due to occurrence of an abnormality in the transmission 40.

Figure 4:
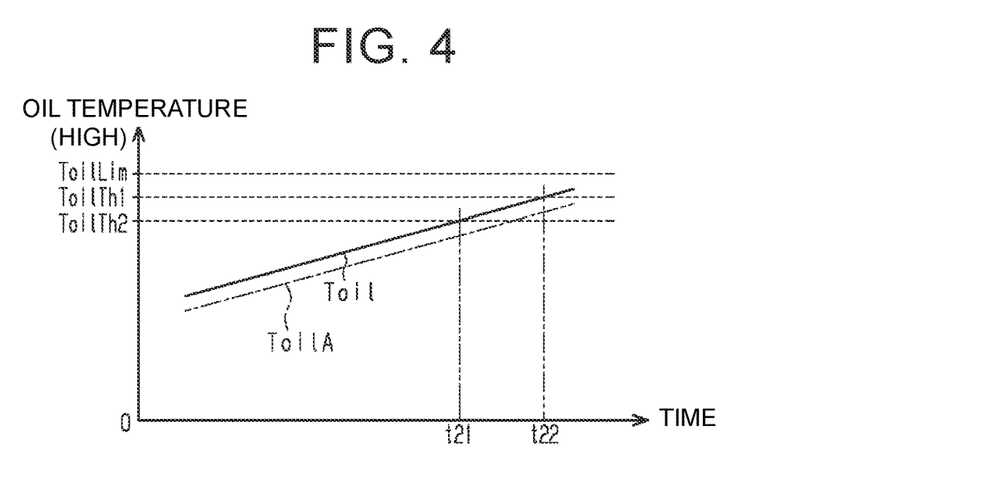
FIG. 4 is a time chart showing a transition of the oil temperature detection value and the estimated value of the oil temperature.
Figure 5:
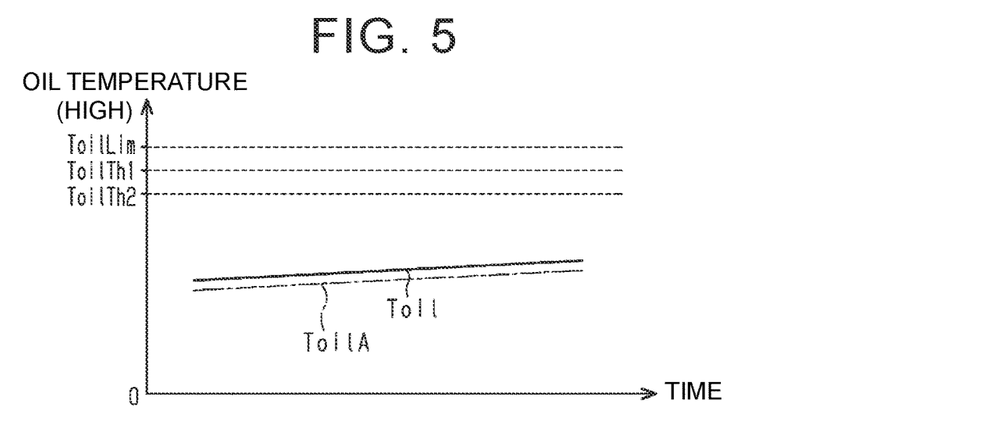
FIG. 5 is a time chart showing a transition of the oil temperature detection value and the estimated value of the oil temperature.

FIGS. 4 and 5 show the relationship between the oil temperature detection value Toil and the estimated value of the oil temperature ToilA when no abnormality has occurred in the transmission 40. In the example shown in FIG. 4, the driver performs the vehicle operation that causes the oil temperature to rise. Examples of the vehicle operation that cause the oil temperature to rise include a vehicle operation for intermittently running the vehicle VC at high speed, and a vehicle operation for repeating acceleration and deceleration of the vehicle VC. When the driver performs the vehicle operation that causes the oil temperature to rise, the oil temperature detection value Toil gradually increases as shown by the solid line in FIG. 4, and the estimated value of the oil temperature ToilA also gradually increases as shown by the long dashed short dashed line in FIG. 4. Then, when the oil temperature detection value Toil reaches the second oil temperature determination value ToilTh2 at time t21, a weak warning is started. In this case, since the estimated value of the oil temperature ToilA is also high, the output variable Y output from the mapping is a value indicating that the oil temperature has risen due to the mode of vehicle operation by the driver of the vehicle. Therefore, the notification device 70 notifies the driver that the oil temperature is increasing due to the driver's vehicle operation.

After that, when the driver continues to perform the vehicle operation that causes the oil temperature to rise, the oil temperature detection value Toil reaches the first oil temperature determination value ToilTh1 at time t22. Then, the warning issued by the notification device 70 shifts from a weak warning to a strong warning. Even under such circumstances, since the driver is performing the vehicle operation that causes the oil temperature to rise, the estimated value of the oil temperature ToilA also increases. Therefore, the output variable Y output from the mapping is a value indicating that the oil temperature has risen due to the mode of vehicle operation by the driver of the vehicle. As a result, the notification device 70 notifies the driver that the oil has become overheated due to the driver's vehicle operation.

On the other hand, in the example shown in FIG. 5, the driver does not perform the vehicle operation that causes the oil temperature to rise. In this case, since no abnormality has occurred in the transmission 40, the oil temperature detection value Toil and the estimated value of the oil temperature ToilA do not increase. As a result, the notification device 70 does not perform notification.

According to the present embodiment, the following effects can be obtained.

(1-1) Based on the output variable Y output from the mapping by inputting the input variables to the mapping, it is determined whether the oil temperature detection value Toil becomes equal to or higher than the oil temperature determination values ToilTh1, ToilTh2 due to occurrence of an abnormality in the transmission 40 or the mode of the driver's vehicle operation. As a result, it is possible to suppress the determination that an abnormality has occurred in the transmission 40 from being made even though an abnormality has not occurred in the transmission 40.

(1-2) The higher the vehicle speed SPD is, the larger the amount of operation of the transmission 40 becomes. Therefore, the oil temperature tends to rise. Further, the larger the accelerator operation amount ACCP is, the larger the input from the power source of the vehicle VC to the transmission 40 becomes. Since the amount of operation of the transmission 40 increases, the oil temperature tends to rise. Therefore, in the present embodiment, the vehicle speed SPD and the accelerator operation amount ACCP are used as the input variables of the mapping. Thus, by using the output variable Y output from such a mapping, it is possible to improve the accuracy of determining the factor that causes the oil temperature detection value Toil to become equal to or higher than the oil temperature determination values ToilTh1, ToilTh2.

(1-3) In the present embodiment, the oil circulating in the transmission 40 is cooled by heat exchange with the coolant of the internal combustion engine 10. Thus, the oil temperature is easily affected by the temperature of the coolant of the internal combustion engine 10. Therefore, in addition to the oil temperature detection value Toil, the vehicle speed SPD, and the accelerator operation amount ACCP, the coolant temperature detection value Twt is also used as an input variable for the mapping. Thus, by using the output variable Y output from such a mapping, it is possible to improve the accuracy of determining the factor that causes the oil temperature detection value Toil to become equal to or higher than the oil temperature determination values ToilTh1, ToilTh2.

(1-4) The higher the outside air temperature detection value Tout is, the higher the oil temperature tends to be. Therefore, in the present embodiment, the outside air temperature detection value Tout is also used as an input variable for mapping. By using the output variable Y output from such a mapping, it is possible to improve the accuracy of determining the factor that causes the oil temperature detection value Toil to become equal to or higher than the oil temperature determination values ToilTh1, ToilTh2.

(1-5) In the present embodiment, when the oil temperature detection value Toil becomes equal to or higher than the oil temperature determination values ToilTh1, ToilTh2, the cause thereof is notified to the driver by the notification device 70. Therefore, it is possible to have the driver take measures according to the notified contents.

Second Embodiment

A second embodiment will be described with reference to the drawings, focusing on the differences from the first embodiment.

In the present embodiment, the mapping data DM is data that defines a mapping that outputs the estimated value of the oil temperature ToilE as an element corresponding to input variables when various input variables are input.

Figure 6:
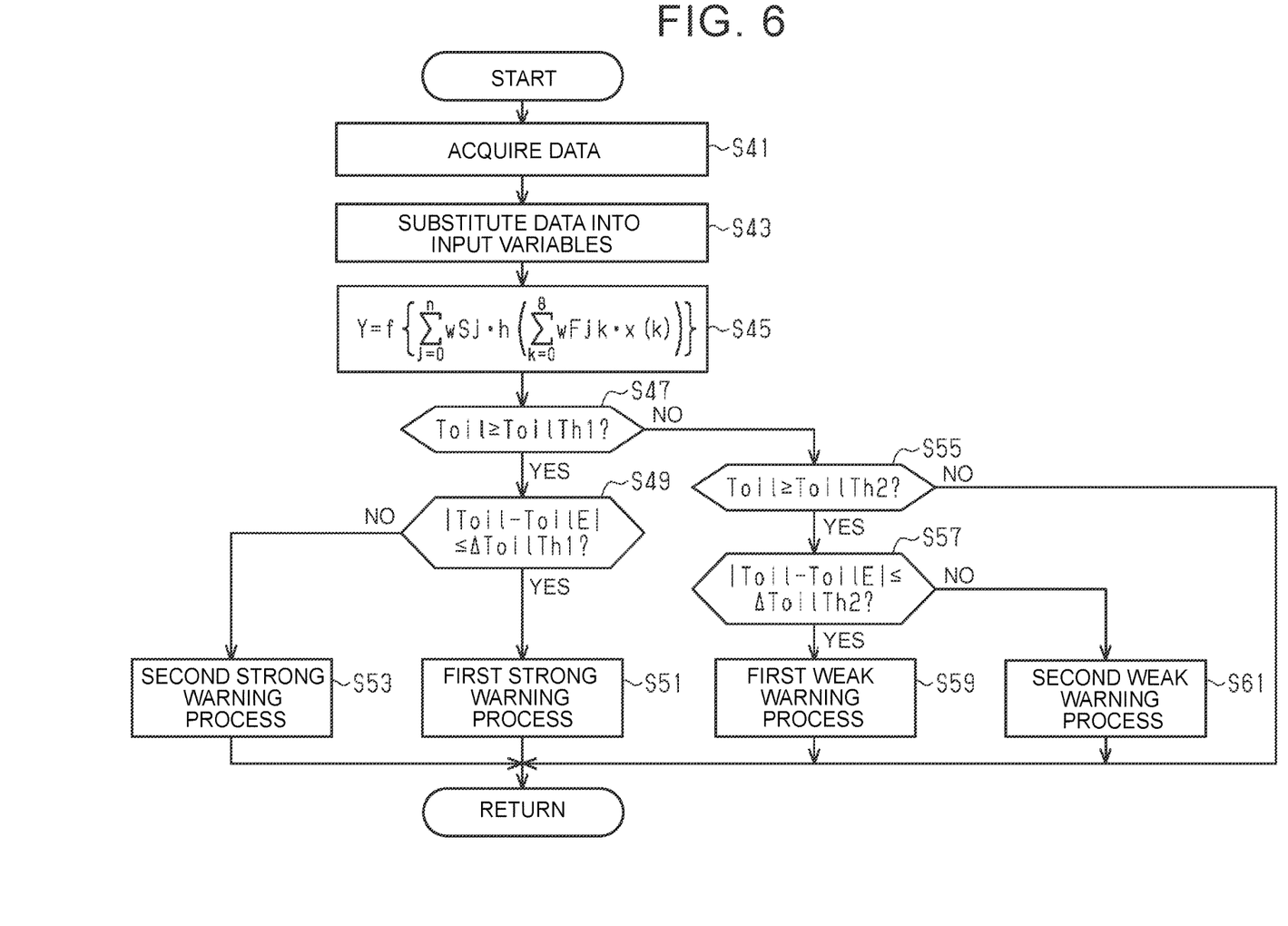
FIG. 6 is a flowchart showing a series of processes executed by a control device in a second embodiment.

Next, with reference to FIG. 6, a series of processing procedures executed by the control device 80 in order to determine the cause when the oil circulating in the transmission 40 becomes overheated will be described. The series of processes shown in FIG. 6 is realized when the CPU 81 repeatedly executes the program stored in the ROM 82 at a predetermined cycle.

First, in step S41, the CPU 81 acquires various data in the same manner as in step S11. That is, the CPU 81 acquires the time series data of the oil temperature detection value Toil, the vehicle speed SPD, the accelerator operation amount ACCP, the coolant temperature detection value Twt, and the outside air temperature detection value Tout. Subsequently, in step S43, the CPU 81 substitutes each detection value acquired in step S41 into the input variables x(1) to x(8) for mapping for deriving the estimated value of the oil temperature ToilE. That is, the CPU 81 substitutes the oil temperature detection value Toil(1) into the input variable x(1), the oil temperature detection value Toil(2) into the input variable x(2), the oil temperature detection value Toil(3) into the input variable x(3), and the oil temperature detection value Toil(4) into the input variable x(4). Further, the CPU 81 substitutes the vehicle speed SPD into the input variable x(5) and the accelerator operation amount ACCP into the input variable x(6). Further, the CPU 81 substitutes the coolant temperature detection value Twt into the input variable x(7) and the outside air temperature detection value Tout into the input variable x(8).

Then, in the next step S45, the CPU 81 calculates the output variable Y by inputting the input variables x(1) to x(8) into the mapping defined by the mapping data DM stored in the storage device 83. In the present embodiment, the estimated value of the oil temperature ToilE is calculated as the output variable Y.

In the present embodiment, the mapping is configured as a fully connected feedforward neural network with one intermediate layer. The above neural network includes an activation function h(x) as an input side-nonlinear mapping that non-linearly transforms each of the input side coefficient wFjk (j=0 to n, k=0 to 5) and the output of the input side linear mapping which is a linear mapping defined by the input side coefficient wFjk. In the present embodiment, the hyperbolic tangent "tanh(x)" is exemplified as the activation function h(x). Further, the above neural network includes an activation function f(x) as an output side-nonlinear mapping that non-linearly transforms each of the output side coefficient wSj (j=0 to n) and the output of the output side linear mapping which is a linear mapping defined by the output side coefficient wSj. In the present embodiment, the hyperbolic tangent "tanh(x)" is exemplified as the activation function f(x). The value n indicates the dimension of the intermediate layer. In the present embodiment, the value n is smaller than the dimension "8" of the input variable x. The input side coefficient wFj0 is a bias parameter and is a coefficient of the input variable x(0). The input variable x(0) is defined as "1". Further, the output side coefficient wS0 is a bias parameter.

The mapping data DM is a learned model learned using a vehicle having the same specifications as the vehicle VC before being mounted on the vehicle VC. Here, in learning of the mapping data DM, training data including teacher data and input data is acquired in advance. That is, when the vehicle is actually running, the time series data of the oil temperature detection value Toil, the vehicle speed SPD, the accelerator operation amount ACCP, the coolant temperature detection value Twt, and the outside air temperature detection value Tout are acquired as the input data. Further, the oil temperature detection value Toil at that time is acquired as the teacher data.

Then, by running the vehicle under various situations, a plurality of training data including the teacher data and the input data are generated. For example, by mounting a transmission 40 in which no abnormality has occurred in a vehicle and running the vehicle, the oil temperature detection value Toil and other detection values when no abnormality has occurred in the transmission 40 can be acquired.

The mapping data DM is learned using such a plurality of training data. That is, the input side variable and the output side variable are adjusted such that the difference between the value output by the mapping data DM with the input data as the input and the oil temperature detection value Toil is equal to or smaller than a predetermined error allowable value.

In step S47, the CPU 81 determines whether the oil temperature detection value Toil is equal to or higher than the first oil temperature determination value ToilTh1. When the oil temperature detection value Toil is equal to or higher than the first oil temperature determination value ToilTh1 (S47: YES), the CPU 81 shifts the process to the next step S49. In step S49, the CPU 81 determines whether the difference between the oil temperature detection value Toil and the estimated value of the oil temperature ToilE is equal to or smaller than the first difference determination value ΔToilTh1. When the oil is overheated due to the driver's vehicle operation, the estimated value of the oil temperature ToilE rises in the same manner as the oil temperature detection value ToilE. Therefore, the difference between the oil temperature detection value Toil and the estimated value of the oil temperature ToilE is small. Thus, the first difference determination value ΔToilTh1 is set as a criterion for determining whether the oil is overheated due to the driver's vehicle operation.

When the difference between the oil temperature detection value Toil and the estimated value of the oil temperature ToilE is equal to or smaller than the first difference determination value ΔToilTh1 (S49: YES), the CPU 81 shifts the process to the next step S51. In step S51, the CPU 81 executes the first strong warning process. That is, in the first strong warning process, the CPU 81 causes the notification device 70 to notify the driver that the oil is in an overheated state due to the driver's vehicle operation. After that, the CPU 81 temporarily ends the series of processes. On the other hand, in step S49, when the difference between the oil temperature detection value Toil and the estimated value of the oil temperature ToilE is larger than the first difference determination value ΔToilTh1 (S49: NO), the CPU 81 shifts the process to the next step S53. In step S53, the CPU 81 executes the second strong warning process. That is, in the second strong warning process, the CPU 81 causes the notification device 70 to notify the driver that the oil is in an overheated state due to occurrence of an abnormality in the transmission 40. After that, the CPU 81 temporarily ends the series of processes.

On the other hand, in step S47, when the oil temperature detection value Toil is lower than the first oil temperature determination value ToilTh1 (S47: NO), the CPU 81 shifts the process to the next step S55. In step S55, the CPU 81 determines whether the oil temperature detection value Toil is equal to or higher than the second oil temperature determination value ToilTh2. When the oil temperature detection value Toil is lower than the second oil temperature determination value ToilTh2 (S55: NO), the CPU 81 temporarily ends the series of processes. On the other hand, when the oil temperature detection value Toil is equal to or higher than the second oil temperature determination value ToilTh2 (S55: YES), the CPU 81 shifts the process to the next step S57. In step S57, the CPU 81 determines whether the difference between the oil temperature detection value Toil and the estimated value of the oil temperature ToilE is equal to or smaller than the second difference determination value ΔToilTh2. When the oil temperature is increasing due to the driver's vehicle operation, the estimated value of the oil temperature ToilE rises in the same manner as the oil temperature detection value ToilE. Therefore, the difference between the oil temperature detection value Toil and the estimated value of the oil temperature ToilE is small. Thus, the second difference determination value ΔToilTh2 is set as a criterion for determining whether the oil temperature is increasing due to the driver's vehicle operation. The second difference determination value ΔToilTh2 may be equal to the first difference determination value ΔToilTh1 or may be different from the first difference determination value ΔToilTh1.

When the difference between the oil temperature detection value Toil and the estimated value of the oil temperature ToilE is equal to or smaller than the second difference determination value ΔToilTh2 (S57: YES), the CPU 81 shifts the process to the next step S59. In step S59, the CPU 81 executes the first weak warning process. That is, in the first weak warning process, the CPU 81 causes the notification device 70 to notify the driver that the oil temperature is increasing due to the driver's vehicle operation. After that, the CPU 81 temporarily ends the series of processes. On the other hand, in step S57, when the difference between the oil temperature detection value Toil and the estimated value of the oil temperature ToilE is larger than the second difference determination value ΔToilTh2 (S57: NO), the CPU 81 shifts the process to the next step S61. In step S61, the CPU 81 executes the second weak warning process. That is, in the second weak warning process, the CPU 81 causes the notification device 70 to notify the driver that the oil temperature is increasing due to occurrence of an abnormality in the transmission 40. After that, the CPU 81 temporarily ends the series of processes.

The operations of the present embodiment will be described. By inputting the accelerator operation amount ACCP and the vehicle speed SPD as input variables to the mapping, the estimated value of the oil temperature ToilE is output as the output variable Y of the mapping. In the present embodiment, based on the estimated value of the oil temperature ToilE, it is determined whether the oil temperature detection value Toil becomes equal to or higher than the oil temperature determination values ToilTh1, ToilTh2 due to occurrence of an abnormality in the transmission 40 or the mode of the driver's vehicle operation. As a result, the determination that an abnormality has occurred in the transmission 40 even though an abnormality has not occurred in the transmission 40 is suppressed from being made.

When the time chart shown in FIG. 3 is viewed by replacing the estimated value of the oil temperature ToilA with the estimated value of the oil temperature ToilE, in FIG. 3, the oil temperature detection value Toil is increased, while the estimated value of the oil temperature ToilE has not risen much. That is, the difference between the oil temperature detection value Toil and the estimated value of the oil temperature ToilE is gradually increasing. Thus, in this case, it can be inferred that the oil temperature has risen due to occurrence of an abnormality in the transmission 40. Therefore, when the oil temperature detection value Toil becomes equal to or higher than the oil temperature determination values ToilTh1, ToilTh2, the notification device 70 notifies the driver that an abnormality has occurred in the transmission 40.

Further, when the time chart shown in FIG. 4 is viewed by replacing the estimated value of the oil temperature ToilA with the estimated value of the oil temperature ToilE, in FIG. 4, both the oil temperature detection value Toil and the estimated value of the oil temperature ToilE increase. Therefore, in this case, it can be inferred that the oil temperature is rising due to the driver's vehicle operation. Therefore, when the oil temperature detection value Toil becomes equal to or higher than the oil temperature determination values ToilTh1, ToilTh2, the notification device 70 notifies the driver that the oil temperature is increasing due to the driver's vehicle operation.

Further, when the time chart shown in FIG. 5 is viewed by replacing the estimated value of the oil temperature ToilA with the estimated value of the oil temperature ToilE, in FIG. 5, neither of the oil temperature detection value Toil and the estimated value of the oil temperature ToilE have risen much. Therefore, in this case, it can be inferred that the driver has not performed the vehicle operation that causes the oil temperature to rise and that no abnormality has occurred in the transmission 40. Thus, the notification device 70 does not perform notification.

According to the present embodiment, in addition to the above (1-1) and (1-5), the following effects can be further obtained.

(2-1) The higher the vehicle speed SPD is, the larger the amount of operation of the transmission 40 becomes. Therefore, the oil temperature tends to rise. Further, the larger the accelerator operation amount ACCP is, the larger the input from the power source of the vehicle VC to the transmission 40 becomes. Since the amount of operation of the transmission 40 increases, the oil temperature tends to rise. Therefore, in the present embodiment, the vehicle speed SPD and the accelerator operation amount ACCP are used as the input variables of the mapping. Thus, the accuracy of estimating the oil temperature can be improved. As a result, by using the estimated value of the oil temperature ToilE output from the mapping, it is possible to improve the accuracy of determining the factor that causes the oil temperature detection value Toil to become equal to or higher than the oil temperature determination values ToilTh1, ToilTh2.

(2-2) Since the oil circulating in the transmission 40 is cooled by heat exchange with the coolant of the internal combustion engine 10, the oil temperature is easily affected by the temperature of the coolant of the internal combustion engine 10. Therefore, in addition to the oil temperature detection value Toil, the vehicle speed SPD, and the accelerator operation amount ACCP, the coolant temperature detection value Twt is also used as an input variable for the mapping. Thus, the accuracy of estimating the oil temperature can be improved. As a result, by using the estimated value of the oil temperature ToilE output from the mapping, it is possible to improve the accuracy of determining the factor that causes the oil temperature detection value Toil to become equal to or higher than the oil temperature determination values ToilTh1, ToilTh2.

(2-3) The higher the outside air temperature detection value Tout is, the higher the oil temperature tends to be. Therefore, in the present embodiment, the outside air temperature detection value Tout is also used as an input variable for mapping. Thus, the accuracy of estimating the oil temperature can be improved. As a result, by using the estimated value of the oil temperature ToilE output from the mapping, it is possible to improve the accuracy of determining the factor that causes the oil temperature detection value Toil to become equal to or higher than the oil temperature determination values ToilTh1, ToilTh2.

An example of the abnormality determination device in each of the above embodiments is the control device 80. An example of the power source of the vehicle is the internal combustion engine 10, the first motor generator 30, and the second motor generator 35. An example of the drive wheel is the drive wheels 60. An example of the power transmission device is the transmission 40. An example of the oil temperature sensor is the oil temperature sensor 104. An example of the vehicle is the vehicle VC. An example of the execution device is the CPU 81 and the ROM 82. An example of the storage device is the storage device 83. An example of the mapping data is the mapping data DM. An example of the acquisition process is the process of step S11 in FIG. 2 and the process of step S41 in FIG. 6. An example of the cause determination process is the process of step S19 and the process of step S25 in FIG. 2, and the process of step S49 and the process of step S57 in FIG. 6. An example of the mapping is the mapping defined by the calculation formula used in the process of step S15 in FIG. 2. An example of the mapping is the mapping defined by the calculation formula used in the process of step S45 in FIG. 6. Examples of the estimation variable include the vehicle speed SPD and the accelerator operation amount ACCP. An example of the internal combustion engine is the internal combustion engine 10. An example of the temperature of the coolant of the internal combustion engine is the coolant temperature detection value Twt. An example of the outside air temperature is the outside air temperature detection value Tout. An example of the notification device is the notification device 70. An example of the warning system is the control device 80 and the notification device 70.

Modifications

Each of the embodiments described above can be modified and implemented as follows. Each of the embodiments described above and modifications described below may be carried out in combination within a technically consistent range.

About Mapping

In each of the above embodiments, the activation function for the mapping is an example, and is not limited to the example of each of the above embodiments. For example, a logistic sigmoid function may be adopted as an activation function for mapping.

In each of the above embodiments, as the neural network, a neural network having one intermediate layer is exemplified, but the number of intermediate layers may be two or more.

In each of the above embodiments, as the neural network, a fully connected feedforward neural network is exemplified, but the neural network is not limited to this. For example, as the neural network, a recurrent neural network may be adopted.

In each of the above embodiments, the function approximator as a mapping is not limited to the neural network. For example, the function approximator may be a regression equation without an intermediate layer.

About Estimation Variable

The estimation variable does not have to include the accelerator operation amount ACCP as long as the estimation variable includes the vehicle speed SPD.

The estimation variable does not have to include the vehicle speed SPD as long as the estimation variable includes the accelerator operation amount ACCP.

As described in the "About Vehicle" column below, when the vehicle is a vehicle equipped with an internal combustion engine but not a motor generator, the engine speed, which is the rotation speed of the crankshaft of the internal combustion engine, may be included in the estimation variable. Further, the opening degree of the throttle valve provided in the intake passage of the internal combustion engine may be included in the estimation variable.

The number of data of the oil temperature detection value Toil that constitutes the time series data of the oil temperature detection value Toil is not limited to "four". For example, the number of data may be less than "three" or "five" or more.

In the first embodiment, the time series data of the oil temperature detection value Toil is used as an input variable for the mapping, but the present disclosure is not limited to this. As long as the factor that causes the increase in the oil temperature detection value Toil can be determined based on the output variable Y output from the mapping by inputting the oil temperature detection value Toil at that time into the mapping as an input variable, the time series data does not have to be used.

About Input Variable

The input variable does not have to include the coolant temperature detection value Twt.

The input variable does not have to include the outside air temperature detection value Tout.

The temperature of the oil circulating in the internal combustion engine 10 may be included in the input variable.

About Cooling Device

As long as heat exchange can be performed between the coolant of the internal combustion engine 10 and the oil circulating in the transmission 40, the oil does not have to be cooled by the cooling device 15.

The cooling device for the oil circulating in the transmission 40 may be provided separately from the cooling device for the coolant circulating in the internal combustion engine 10.

About Execution Device

The execution device is not limited to an execution device that includes the CPU 81 and the ROM 82 and executes software processing. For example, the execution device may include a dedicated hardware circuit that executes hardware processes in place of at least part of the software processes executed in each of the above embodiments. As a dedicated hardware circuit, for example, an application specific integrated circuit (ASIC) can be applied. ASIC is an abbreviation for "application specific integrated circuit". That is, the execution device only needs to have any of the following configurations (a) to (c):

(a) a configuration including a processing device that executes all of the above processes according to a program and a program storage device such as a ROM for storing the program;

(b) a configuration including a processing device that executes part of the above processes according to a program, a program storage device, and a dedicated hardware circuit that executes the remaining processes; and (c) a configuration including a dedicated hardware circuit that executes all of the above processes. Here, the above configurations may have a plurality of software execution devices including a processing device and a program storage device and a plurality of dedicated hardware circuits.

About Notification Device

The notification device is not limited to an in-vehicle device. For example, the notification device may be a mobile terminal owned by the driver of the vehicle. Examples of the mobile terminal include smartphones and tablet terminals. In this case, the result of executing the cause determination process is transmitted directly from the vehicle VC to the mobile terminal, or transmitted from the vehicle VC to the mobile terminal via a server. Then, the mobile terminal performs the notification according to the received content.

About Power Transmission Device

The power transmission device is not limited to the stepped transmission. The power transmission device may be a stepless transmission (e.g.: a Continuously Variable Transmission).

The power transmission device is not limited to the transmission 40 as long as the power transmission device is provided in the power transmission path from the power source of the vehicle to the drive wheels and oil circulates inside. For example, the power transmission device may be a device having no shifting function.

About Vehicle

The vehicle is not limited to series/parallel hybrid vehicles. The vehicle may be, for example, a series hybrid vehicle or a parallel hybrid vehicle. Further, the vehicle does not have to be a hybrid vehicle. That is, a vehicle having an internal combustion engine but not having a motor generator may be used, or a vehicle having a motor generator but not having an internal combustion engine may be used.

What is claimed is:

1. A device for a vehicle, the vehicle having a power transmission device and a sensor that detects an oil temperature that is a temperature of oil circulating in the power transmission device, the device comprising:
- a memory configured to store mapping data including data learned by machine learning, the data defining a mapping that uses an estimation variable that is a variable indicating a vehicle operation status of the vehicle and a detection value of the sensor as input variables, and uses an element corresponding to the input variables as an output variable; and
- a processor configured to:
  - acquire the input variables;
  - use the mapping to acquire the element as the output variable of the mapping corresponding to the input variables; and
  - determine based on the element that the cause for the detection value becoming equal to or higher than a threshold value is (i) an abnormality in the power transmission device or (ii) a mode of vehicle operation by a driver of the vehicle.

2. The device according to claim 1, wherein the mapping uses a variable specifying that the cause for the detection value becoming equal to or higher than the threshold value (i) the abnormality in the power transmission device or (ii) the mode of vehicle operation by the driver of the vehicle as the output variable that is the element corresponding to the input variables.

3. The device according to claim 1, wherein:
- the mapping uses an estimated value of the oil temperature as the output variable that is the element corresponding to the input variables; and
- the processor is configured to:
  - acquire the estimated value of the oil temperature using the mapping and the input variables; and
  - determine based on the estimated value of the oil temperature that the cause for the detection value becoming equal to or higher than the threshold value is (i) the abnormality in the power transmission device or (ii) the mode of vehicle operation by the driver of the vehicle, when the detection value becomes equal to or higher than the threshold value.

4. The device according to claim 1, wherein the estimation variable includes at least one of a vehicle speed and an accelerator operation amount.

5. The device according to claim 4, wherein:
- the vehicle is provided with an internal combustion engine, and the oil is cooled by heat exchange with a coolant of the internal combustion engine; and
- the input variables further include a temperature of the coolant of the internal combustion engine.

6. The device according to claim 1, wherein the input variables further include an outside air temperature.

7. A system comprising:
- a device according to claim 1; and
- a notification device that, when the detection value becomes equal to or higher than the threshold value, notifies the driver of the vehicle based on a result of determining (i) the abnormality in the power transmission device or (ii) the mode of vehicle operation by the driver of the vehicle as the cause for the detection value becoming equal to or higher than the threshold value.

8. The system according to claim 7, wherein the notification device provides a first notification to the driver when the cause is the abnormality in the power transmission device, and provides a second, different notification to the driver when the cause is the mode of vehicle operation by the driver.

9. A method comprising:
- acquiring a detection value of a sensor and an estimation variable as input variables, the sensor detecting an oil temperature that is a temperature of oil circulating in a power transmission device for a vehicle, the estimation variable being a variable indicating a vehicle operation status of the vehicle;
- using a mapping to acquire an element as an output variable of the mapping, the output variable corresponding to the input variables, the mapping being defined by data included in mapping data, the mapping data being stored in a memory, the data being learned by machine learning; and
- determining based on the element that the cause for the detection value becoming equal to or higher than a threshold value is (i) an abnormality in the power transmission device or (ii) a mode of vehicle operation by a driver of the vehicle.

* * * * *